Figure 1:
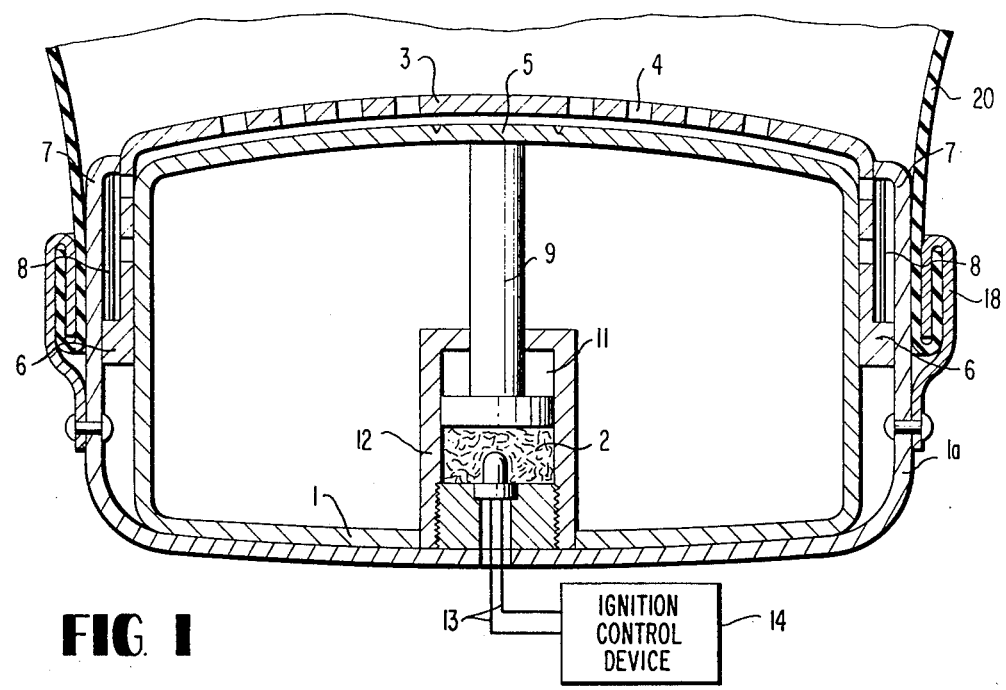

United States Patent [19]
Grosch et al.

[11] 3,797,853
[45] Mar. 19, 1974

[54] SAFETY DEVICE FOR VEHICLES
[75] Inventors: Ernst Grosch, Hennefsieg; Heinz Gawlick, Furth; Hellmut Bendler, Erlangen-Spardorf; Karl-Egon Flach, Cologne-Riehl, all of Germany
[73] Assignee: Dynamit Nobel AG, Troisdorf, Germany
[22] Filed: Apr. 13, 1972
[21] Appl. No.: 243,674

[30] Foreign Application Priority Data
 Apr. 17, 1971 Germany............................ 2118745

[52] U.S. Cl. ............ 280/150 AB, 137/71, 137/455, 222/5, 222/163, 222/492
[51] Int. Cl. ............................................. B60r 21/08
[58] Field of Search .... 280/150 AB, 150 B; 137/71, 137/455; 222/3, 5, 163, 492

[56] References Cited
UNITED STATES PATENTS
3,638,964 2/1972 Chute ........................ 280/150 AB
3,651,988 3/1972 Cirillo.................................. 222/3
3,618,976 11/1971 Leising et al................. 280/150 AB
3,663,036 5/1972 Johnson................................. 222/5

FOREIGN PATENTS OR APPLICATIONS
429,467 5/1935 Great Britain...................... 222/492

Primary Examiner—Kenneth H. Betts
Assistant Examiner—John P. Silverstrim
Attorney, Agent, or Firm—Craig and Antonelli

[57] ABSTRACT

A safety device for vehicles, especially automotive vehicles, having a bag disposed in front of the occupant and being inflatable in the manner of a cushion, which bag is in operative connection via a diffuser with a source of compressed gas which can be actuated by an ignition device triggered by a release element responding when a predetermined deceleration value has been exceeded, wherein the diffuser is fashioned as a cover which is resiliently connected to the source of compressed gas and is disposed in the manner of a cap over the source of compressed gas so as to be displaceable to a limited extent in a telescopic manner.

10 Claims, 2 Drawing Figures

PATENTED MAR 19 1974  3,797,853

IGNITION CONTROL DEVICE

SAFETY DEVICE FOR VEHICLES

The invention relates in general to safety devices for vehicles, particularly automotive vehicles, and more particularly to a device for protecting passengers in the motor vehicle in the event of collision, in the form of a bag disposed in front of the occupant and inflatable into the form of a protective cushion.

For automotive vehicles and airplanes, systems have been known wherein a bag is provided in operative connection, via a diffuser, with a source of compressed gas which can be actuated by an igniting device triggered via a release element responding when a predetermined level of deceleration of the vehicle has been exceeded. When a predetermined degree of deceleration has been exceeded, an electrical switching mechanism actuates a gas generator, wherein the gas, due to the opening of a valve, flows under pressure out of the container and, via the distributor or diffuser provided with openings, into an inflatable bag to inflate the bag. The time available for the inflation is, in general, extremely short and must range on the order of 15–40 milliseconds, and so the use of an igniting device to trigger the operation is desirable.

The gas generator can be fashioned in various ways, for example, it can be provided as a container filled with compressed gas. In this case only a valve need be opened, for example by means of a powder charge or explosive charge, so that the gas can flow via the diffuser into the bag. Another possibility for fashioning the gas generator resides in the rapid evaporation of liquids, for example freon, by the hot reaction gases.

In all of these processes, it is of great importance that the gas is introduced from the original gas space first into a distributor or diffuser, before it can inflate the bag. In this connection, the distributor fulfills several functions. First of all, the high ambient pressure initially in the gas generator is substantially reduced in the diffuser; furthermore, the pistol-like report normally accompanying discharge is effectively damped; and, finally, the gas flowing out of an opened valve into the diffuser is spatially distributed in a uniform manner over the large surface of the bag to provide for efficient and rapid opening of the bag. However, in the conventional systems, the diffuser occupies an undesirably large space.

A disadvantage of the large space requirement demanded by the known diffuser constructions is that the available storage space in the vehicle carrying the system is generally very small in most cases, which is true, in particular, when small inner passenger spaces are involved or when the safety mechanism must be accommodated in another appliance, for example in the steering wheel of an automotive vehicle. In such a case, it can happen that the space required for housing the gas generator, the diffuser, and the bag is not available.

The invention serves the purpose of avoiding this disadvantage by forming the diffuser as a cover which extends with its rim over the source of compressed gas in the manner of a cap and is disposed on this source so that it is telescopically displaceable in a limited manner, this cover being provided with gas outlet apertures. By the combination of the diffuser with the source of compressed gas, a low space requirement is attained, since the cover can be entirely pushed onto the compressed gas container until it is contiguous with the end of the container in the rest position, so that the diffuser chamber proper is formed only when the system is actuated.

In this connection, the bag can be directly connected with the movable diffuser, so that the bag and the diffuser are advanced together during the reaction. The limited displaceability of the diffuser prevents the latter from being flung into the passenger compartment and thus perhaps injuring the occupant.

In a suitable further embodiment of the invention, the provision is made to dispose the diffuser lid on the source of compressed gas so that the lid is displaceable against a constantly existing force. By providing an appropriately designed spring or other elastic element, it is then possible to influence and brake the displacement of the lid in the desired manner.

The actuation of the diffuser can be effected, in accordance with a feature of the invention, by forming a predetermined rupturing zone in a preferably centrally arranged portion of the container adjacent an unperforated region of the diffuser, which predetermined rupturing zone is in operative association with a piston disposed in a cylinder and axially movable therein to a limited extent. This piston can be triggerd and actuated by means of a propellant powder charge provided with a primer ignition device so as to puncture the rupturing zone to permit escape of the compressed gas through the diffuser. In this connection, it is advantageous to adapt the displaceability of the piston and the diffuser lid to each other, namely in such a manner that the piston and lid reach their terminal position together.

By appropriately dimensioning the cross section of the predetermined rupturing zone and/or the valve port, as well as the piston cross section in conformance with the total cross section of the passage apertures of the cover, it is possible to influence the flow of the compressed gas from the compressed gas source into the diffuser and correspondingly also the exit of the compressed gas from the diffuser into the bag. In this way it is possible to control the inflation of the bag chronologically in the desired manner.

It is therefore an object of the present invention to provide a safety device for vehicles which eliminates or otherwise avoids the disadvantages concerning size and accommodation within the vehicle which are inherent in the known systems of this type.

It is another object of the present invention to provide a safety device of the type described including a source of pressurized gas and a diffuser element associated therewith which provides a combination of substantially the same size as the source of pressurized gas alone.

It is a further object of the present invention to provide a safety device of the type described which is capable of being formed in numerals configurations without sacrifice in operating efficiency to make possible the accommodation of the device in areas of limited size and unusual shape.

Figure 2:
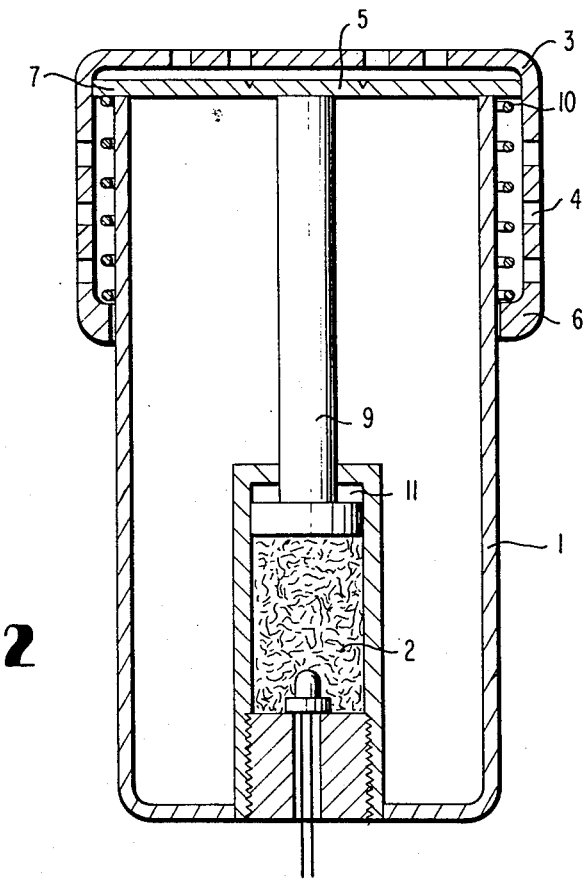

These and other objects, features and advantages of the present invention will be described in greater detail in connection with the accompanying drawings, which illustrate two exemplary embodiments of the invention, and wherein:

FIG. 1 shows, in cross section, a box-like compressed gas container with a cover placed flush thereon in the rest position, and FIG. 2 shows a cross section of a second embodiment of the present invention.

According to FIG. 1, the cylindrical container 1, which houses a compressed gas or a liquid to be vaporized, is provided in its central or middle region with a guide housing 12 forming a cylinder 11 for the piston 9. Below the piston 9, a powder charge 2 is accommodated in the cylinder 11 which is ignitable via the wires 13 connected to a conventional ignition control device 14, which may conventionally be responsive to vehicle deceleration or the like. The end of the piston is held in contact with the central zone of the compressed gas container wall which is fashioned as a predetermined rupturing zone 5. In this regard the rupturing zone 5 is formed in any suitable way, such as by weakening the container wall by providing notches or other means therein.

The cover 3 extends in close proximity over the container 1 in the manner of a cap and is provided with gas passage openings 4. Between the flange 6 of the cover 3, projecting toward the outside, and the rim 7 of the container portion 1a, projecting toward the inside, an elastic ring 8 is disposed which is made of rubber, plastic, or the like. By means of this ring 8, the cover is held in the illustrated rest position until the device is set into action. After the device has been actuated, this ring softly brakes the outward displacement of the cover and can optionally, after the reaction, push the cover resiliently back again into its original position.

After the ignition of the powder charge 2 via the ignition lines 13 by means of the conventional triggering device 14, which is not shown in detail, the thus-produced pressure gases displace the piston 9 within the housing 12. During this step, the front end of the piston 9 punches the plate forming the rupturing zone 5 out of the wall of the container 1. In the further progress of its movement, the piston then pushes the cover 3 telescopically toward the outside against the effective force of the elastic ring 8, whereby the removal of the plate 5 opens the path from the interior of the container 1 into the space between the cover 3 and the opposite wall of the container 1, so that the gases stored or formed therein can flow via the passage openings 4 into the bag. The bag 20 is conventionally secured for inflation to the container 1 in the known manner, such as by bracket 18. By correspondingly dimensioning the plate forming the rupturing zone 5, as well as the cross section and/or diameter of the piston 9, and the dimensioning of the gas passage openings 4, it is possible to effect a displacement of the cover 3 by means of the piston 9 by itself, or by the latter together with the pressure of the outflowing gases.

The embodiment of the device of this invention shown in FIG. 2 corresponds, in principle, to that of FIG. 1. In addition to the fact that the container 1 here has a greater length and a smaller diameter, the stroke of the piston 9 is determined in such a manner that, by the pressure of the powder gases and/or by the thereby effected displacement of the piston 9, the plate 5 is punched out of the wall of the container 1, but no displacement of the cover 3 is effected by the piston 9. Rather, in this embodiment, the displacement of the cover 3 is effected solely by the pressure of the gases flowing out via the valve opening. The braking of the displacement of the cover 3 here takes place by means of the coil spring 10 provided between the inwardly projecting rim 6 of the cover 3 and the outwardly extending edge 7 of the container wall.

As can readily be seen from the two embodiments described herein, the construction of this invention makes it possible to adapt in a simple manner to varying spatial conditions with respect to height and width.

It should be understood that the respective embodiments of the present invention have been described and illustrated herein only by way of example and that the invention is not limited in any way to those embodiments. More particularly, certain structural features may be changed, or specific means may be substituted for equivalent means without departing from the spirit and scope of the present invention.

What we claim is:

1. A safety device for vehicles, especially automotive vehicles comprising an inflatable bag, a source of compressed gas connected to said inflatable bag, ignition means for actuating said source of compressed gas to release gas under force into said inflatable bag, and ignition control means for actuating said ignition means in response to detection of a condition, said source of compressed gas including a closed storage container providing gas under pressure and a diffuser element formed in the shape of a cover having a rim thereof extending over one end of said storage container in telescopic relation therewith, said diffuser element having a plurality of openings and being telescopically displaceable within predetermined limits between a rest position adjacent one end of said storage container and an operating position in which an operating diffusing chamber is formed upon activation of said ignition means, said ignition means including an operating element for opening said storage container adjacent said diffuser element, said diffuser element and said storage container being arranged with respect to one another such that the total space occupied by said diffuser element and said storage container is substantially less in the rest position of said diffuser element than in the operating position thereof.

2. A safety device as defined in claim 1, including resilient biasing means for biasing said diffuser element against movement away from said storage container.

3. A safety device as defined in claim 2, wherein said resilient biasing means is a cylindrical resilient element disposed between a rim of said container and the rim of said diffuser element.

4. A safety device as defined in claim 2, wherein said resilient biasing means is a coil spring disposed between a rim of said container and the rim of said diffuser element.

5. A safety device as defined in claim 2, wherein said storage container has a weakened wall portion forming a rupturing zone adjacent said diffuser element, said operating element of said ignition means is a piston mounted in a cylinder and positioned in operative association with said weakened wall portion of said storage container, said ignition means further including a propellant powder charge on one side of said piston in said cylinder.

6. A safety device as defined in claim 5, wherein said ignition means further includes means for limiting the displacement of said piston and said diffuser element so that displacement of said piston shifts said diffuser element which simultaneously reaches the operating position therewith.

7. A safety device as defined in claim 6, wherein the cross section of said rupturing zone and the cross section of said piston are adapted to a predetermined size of the openings in said diffuser element to control the displacement of said diffuser element.

8. A safety device as defined in claim 1, wherein said storage container has a weakened wall portion forming a rupturing zone adjacent said diffuser element, said operating element of said ignition means is a piston mounted in a cylinder and positioned in operative association with said weakened wall portion of said storage container, said ignition means further including a propellant powder charge on one side of said piston in said cylinder.

9. A safety device according to claim 1, wherein said diffuser element is contiguous with the one end of said container in the rest position thereof.

10. A safety device according to claim 1, wherein said diffuser element is a relatively rigid member.

* * * * *